US010641512B2

(12) United States Patent
Otsuki et al.

(10) Patent No.: US 10,641,512 B2
(45) Date of Patent: May 5, 2020

(54) AIR-CONDITIONING OPERATION CONDITION GENERATION APPARATUS, AIR-CONDITIONING OPERATION CONDITION GENERATION METHOD AND AIR-CONDITIONING SYSTEM

(71) Applicant: Kabushiki Kaisha Toshiba, Tokyo (JP)

(72) Inventors: Tomoshi Otsuki, Kawasaki Kanagawa (JP); Kenichi Fujiwara, Kawasaki Kanagawa (JP); Mamiko Abe, Shinagawa Tokyo (JP); Takahiro Yamamoto, Fuchu Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 54 days.

(21) Appl. No.: 15/911,306

(22) Filed: Mar. 5, 2018

(65) Prior Publication Data

US 2019/0017720 A1 Jan. 17, 2019

(30) Foreign Application Priority Data

Jul. 11, 2017 (JP) ................................ 2017-135627

(51) Int. Cl.

| | |
|---|---|
| ***F24F 11/48*** | (2018.01) |
| ***G05B 13/02*** | (2006.01) |
| ***F24F 11/49*** | (2018.01) |
| ***F24F 11/64*** | (2018.01) |
| ***F24F 11/65*** | (2018.01) |
| ***F24F 11/56*** | (2018.01) |
| ***F24F 11/52*** | (2018.01) |
| *F24F 140/00* | (2018.01) |

(52) U.S. Cl.

CPC .............. *F24F 11/48* (2018.01); *F24F 11/49* (2018.01); *F24F 11/52* (2018.01); *F24F 11/56* (2018.01); *F24F 11/64* (2018.01); *F24F 11/65* (2018.01); *G05B 13/021* (2013.01); *F24F 2140/00* (2018.01)

(58) Field of Classification Search

CPC .. F24F 11/48; F24F 11/52; F24F 11/56; F24F 11/65; F24F 11/64; F24F 11/49; F24F 2140/00; G05B 13/021

See application file for complete search history.

(56) References Cited

U.S. PATENT DOCUMENTS

| | | | | |
|---|---|---|---|---|
| 7,043,339 B2 * | 5/2006 | Maeda | .............. | G05B 23/0294 700/276 |
| 2016/0275222 A1 | 9/2016 | Otsuki et al. | | |

FOREIGN PATENT DOCUMENTS

| | | |
|---|---|---|
| JP | 2000-28175 A | 1/2000 |
| JP | 2008-45779 A | 2/2008 |
| JP | 4294560 B2 | 4/2009 |

(Continued)

*Primary Examiner* — Carlos R Ortiz Rodriguez

(74) *Attorney, Agent, or Firm* — Finnegan, Henderson, Farabow, Garrett & Dunner, L.L.P.

(57) ABSTRACT

An air-conditioning operation condition generation apparatus as an aspect of the present invention generates trial conditions for multiple air conditioners associated with a target space of air-conditioning control, evaluates a trial performed by coordination of the plurality of air conditioners under the trial conditions, and generates actual operation conditions for the plurality of air conditioners to achieve a targeted state in the target space on the basis of evaluation of the trial.

12 Claims, 15 Drawing Sheets

(56) References Cited

FOREIGN PATENT DOCUMENTS

| | | | |
|---|---|---|---|
| JP | 2010-236732 | A | 10/2010 |
| JP | 5642145 | B | 11/2014 |
| JP | 2016-177675 | | 10/2016 |
| JP | 2016-223694 | A | 12/2016 |

* cited by examiner

| TARGET AIR CONDITIONER | SETTABLE ITEM | SETTABLE VALUE |
|---|---|---|
| AIR CONDITIONER 3A | SET TEMPERATURE | 18°C TO 29°C, IN INCREMENTS OF 0.5°C |
| | AIRFLOW DIRECTION | DOWN/HORIZONTAL |
| | AIRFLOW RATE | HIGH |
| AIR CONDITIONER 3B | SET TEMPERATURE | 18°C TO 29°C, IN INCREMENTS OF 0.5°C |
| | AIRFLOW DIRECTION | DOWN/HORIZONTAL/SWING |
| | AIRFLOW RATE | LOW/HIGH/POWERFUL |

FIG. 3

| TRIAL PERMITTED DATE | TRIAL PERMITTED TIME SLOT |
|---|---|
| 8/1(MON) | 0:00-6:00, 22:00-24:00 |
| 8/2(TUE) | 0:00-6:00, 22:00-24:00 |
| 8/3(WED) | 0:00-6:00, 22:00-24:00 |
| 8/4(THU) | 0:00-6:00, 22:00-24:00 |
| 8/5(FRI) | 0:00-6:00, 22:00-24:00 |
| 8/6(SAT) | 0:00-24:00 |
| 8/7(SUN) | 0:00-24:00 |

FIG. 4

| No. | DATE/TIME | PARAMETER COMBINATIONS | | | | | |
|---|---|---|---|---|---|---|---|
| | | AIR CONDITIONER 3A | | | AIR CONDITIONER 3B | | |
| | | SET TEMPERATURE | AIRFLOW RATE | AIRFLOW DIRECTION | SET TEMPERATURE | AIRFLOW RATE | AIRFLOW DIRECTION |
| 1 | 8/1, 1:00-2:00 | 32°C | POWERFUL | DOWN | 32°C | POWERFUL | DOWN |
| . . . | . . . | . . . | . . . | . . . | . . . | . . . | . . . |

| DATE/TIME | TEMPERATURE MEASUREMENT RESULT AT 2:00 | | | |
|---|---|---|---|---|
| | SENSOR 4A | SENSOR 4B | SENSOR 4C | SENSOR 4D |
| 8/1, 1:00-2:00 | 28 | 26 | 26 | 26 |
| ... | ... | ... | ... | ... |

FIG. 6B

| No. | DATE/TIME | TRIAL CONDITIONS | | | | | | RESULT | | TARGETED STATE | | EVALUATION VALUE SQUARED ERROR |
|---|---|---|---|---|---|---|---|---|---|---|---|---|
| | | AIR CONDITIONER 3A | | | AIR CONDITIONER 3B | | | | | | | |
| | | SET TEMPERATURE | AIRFLOW RATE | AIRFLOW DIRECTION | SET TEMPERATURE | AIRFLOW RATE | AIRFLOW DIRECTION | THERMOMETER 1 | THERMOMETER 2 | THERMOMETER 1 | THERMOMETER 2 | |
| HEATING1 | 8/1,1:00-2:00 | 27°C | POWERFUL | DOWN | 27°C | POWERFUL | DOWN | 28.4 | 26.2 | 25 | 22 | 29.2 |
| HEATING2 | 8/1,3:00-4:00 | 25°C | HIGH | HORIZONTAL | 25°C | HIGH | DOWN | 27.2 | 24.2 | 25 | 22 | 9.68 |
| ... | ... | ... | ... | ... | ... | ... | ... | ... | ... | ... | ... | ... |
| HEATING20 | 8/4,3:00-4:00 | 25°C | LOW | HORIZONTAL | 18°C | HIGH | DOWN | 25.1 | 22.3 | 25 | 22 | 0.1 |
| ... | ... | ... | ... | ... | ... | ... | ... | ... | ... | ... | ... | ... |
| HEATING44 | 8/7,23:00-24:00 | 22°C | HIGH | HORIZONTAL | 22°C | HIGH | DOWN | 27.2 | 25.3 | 25 | 22 | 10.88 |

MEASUREMENT RESULT

| SENSOR ID | MEASUREMENT VALUE | IMPROVEMENT |
|---|---|---|
| 1 | 22.0 | OK |
| 2 | 21.5 | OK |
| 3 | 22.0 | OK |
| 4 | 20.5 | OK |
| 5 | 22.5 | OK |
| 6 | 22.0 | OK |
| ... | ... | ... |
| p | 22.0 | OK |

TARGET SPACE

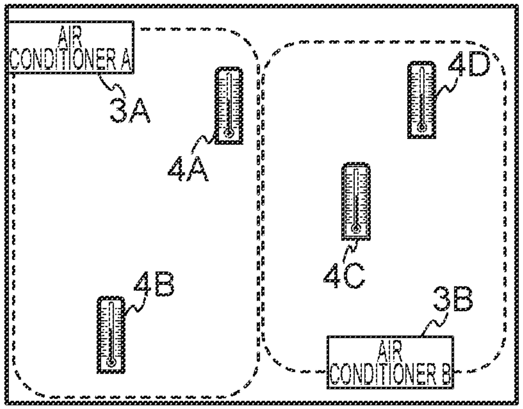

AIR-CONDITIONING SETTING

| AIR CONDITIONER ID | ON/ OFF | OPERATION MODE | SET TEMPERATURE | AIR OUTLET 1 | | | AIR OUTLET 2 | | |
|---|---|---|---|---|---|---|---|---|---|
| | | | | STATE | AIRFLOW RATE | AIRFLOW DIRECTION | STATE | AIRFLOW RATE | AIRFLOW DIRECTION |
| 1 | ON | HEATING | 22°C | OPEN | HIGH | HORIZONTAL | OPEN | HIGH | HORIZONTAL |
| 2 | ON | HEATING | 21°C | OPEN | HIGH | HORIZONTAL | CLOSED | HIGH | HORIZONTAL |
| 3 | ON | HEATING | 24°C | OPEN | HIGH | DOWN | OPEN | HIGH | HORIZONTAL |
| ... | ... | ... | ... | ... | ... | ... | ... | ... | ... |
| m | ON | HEATING | 22°C | OPEN | HIGH | HORIZONTAL | OPEN | HIGH | HORIZONTAL |

FIG. 7

| No. | SET TEMPERATURE | AIRFLOW RATE | AIRFLOW DIRECTION |
|---|---|---|---|
| 1 | 18°C (EXTREME VALUE) | HIGH (REFERENCE VALUE) | HORIZONTAL (REFERENCE VALUE) |
| 2 | 29°C (EXTREME VALUE) | HIGH (REFERENCE VALUE) | HORIZONTAL (REFERENCE VALUE) |
| 3 | 25°C (REFERENCE VALUE) | LOW (EXTREME VALUE) | HORIZONTAL (REFERENCE VALUE) |
| 4 | 25°C (REFERENCE VALUE) | POWERFUL (EXTREME VALUE) | HORIZONTAL (REFERENCE VALUE) |
| 5 | 25°C (REFERENCE VALUE) | HIGH (REFERENCE VALUE) | SWING (EXTREME VALUE) |
| 6 | 25°C (REFERENCE VALUE) | HIGH (REFERENCE VALUE) | DOWN (EXTREME VALUE) |

FIG. 11

| SENSOR ID | IMMEDIATE MEASUREMENT VALUE | ESTIMATED TARGETED STATE |
|---|---|---|
| 4A | 25.4 | ↑ |
| 4B | 27.3 | ↓ |
| 4C | 25.2 | NO CHANGE |
| 4D | 21.2 | NO CHANGE |
| | | |

FIG. 14

AIR-CONDITIONING OPERATION CONDITION GENERATION APPARATUS, AIR-CONDITIONING OPERATION CONDITION GENERATION METHOD AND AIR-CONDITIONING SYSTEM

CROSS-REFERENCE TO RELATED APPLICATION (S)

This application is based upon and claims the benefit of priority from Japanese Patent Application No. 2017-135627, filed Jul. 11, 2017; the entire contents of which are incorporated herein by reference.

FIELD

Embodiments described herein relate generally to an air-conditioning operation condition generation apparatus, an air-conditioning operation condition generation method, and an air-conditioning system.

BACKGROUND

In the case of coordinated control where multiple air conditioners cooperate to control air-conditioning of a target facility, it is difficult to handle a local request regarding the air-conditioning. For example, when a targeted temperature is set for the entire facility, the targeted temperature may not be reached at some parts, depending on the thermal property and the heat load of the facility. Furthermore, due to a difference in people's senses, some people may feel satisfied with a state, while other people are not satisfied with the same state. Even if a person in charge of managing air-conditioning performs fine control so as to handle such a local request, an intended result is difficult to achieve. There are two reasons. One reason is air-conditioning cannot be adjusted for an adjustment target part without considering the thermal property and the heat load of the adjustment target part and the layout and performances of other air conditioners. The other reason is changing one air-conditioner influence another air-conditioning for other than the adjustment target part. Hence, in order to realize a targeted air-conditioning state at any part of a facility, a difficult task of determining a combination of setting values of control factors (actuators) of an air conditioner has to be performed for each air conditioner.

BRIEF DESCRIPTION OF THE DRAWINGS

FIG. 3 is a diagram illustrating examples of operation condition parameters;

FIG. 4 is a diagram illustrating examples of trial permitted time slots;

FIG. 5 is a diagram illustrating examples of generated trial conditions;

FIGS. 6A and 6B are diagrams illustrating examples of measurement results and evaluation values;

FIG. 7 is a diagram illustrating examples of output results;

FIG. 11 is a diagram illustrating examples of partially extreme operation conditions;

FIG. 14 is a diagram illustrating examples of targeted states estimated on the basis of a request.

DETAILED DESCRIPTION

In an embodiment of the present invention, operation conditions are generated for multiple air conditioners which are controlled in a coordinated manner.

An air-conditioning operation condition generation apparatus as an aspect of the present invention generates trial conditions for multiple air conditioners associated with a target space of air-conditioning control, evaluates a trial performed by coordination of the plurality of air conditioners under the trial conditions, and generates actual operation conditions for the plurality of air conditioners to achieve a targeted state in the target space on the basis of evaluation of the trial.

Below, a description is given of embodiments of the present invention with reference to the drawings. The present invention is not limited to the embodiments.

First Embodiment

Figure 1:
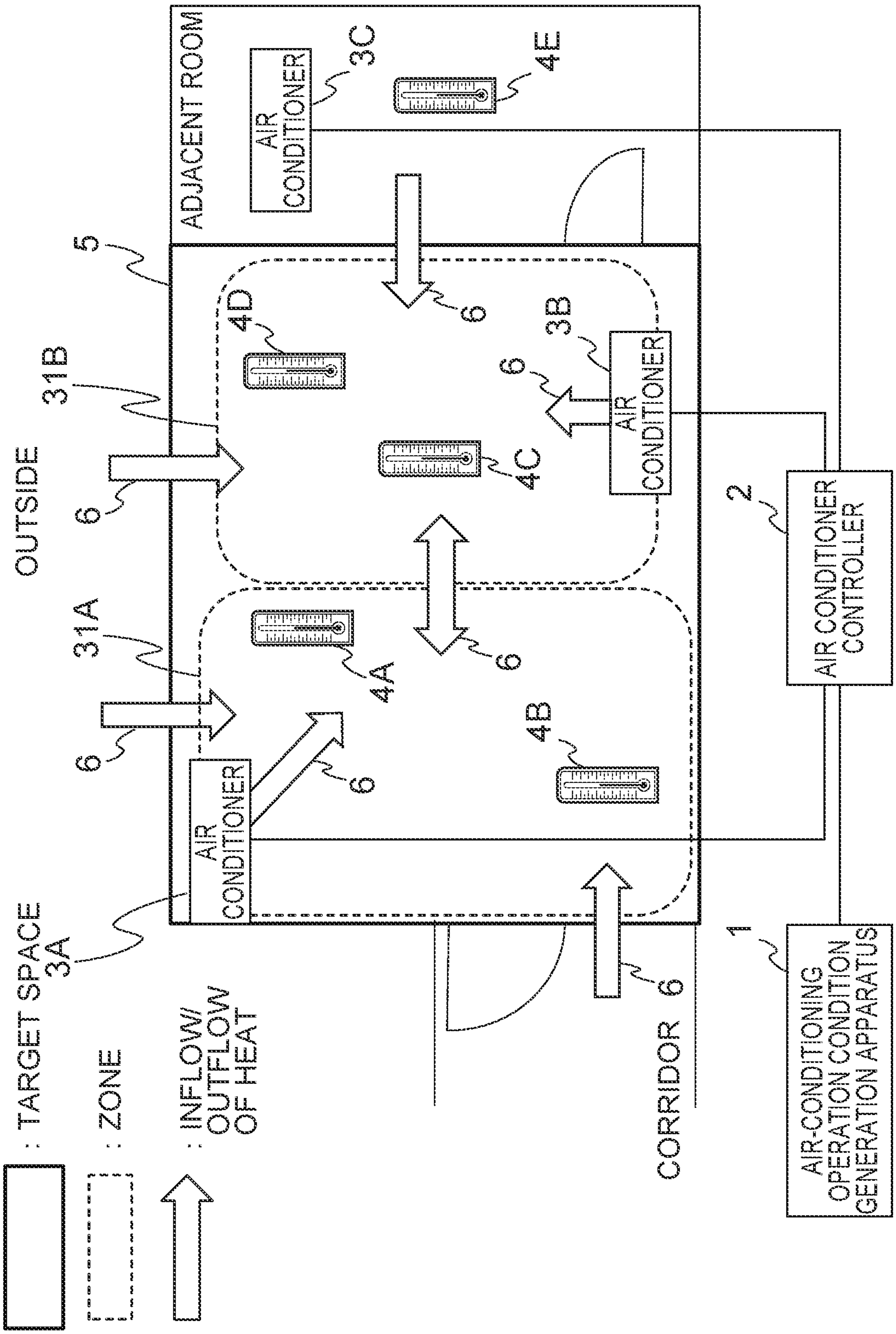
FIG. 1 is a conceptual diagram illustrating an example of an air-conditioning system according to a first embodiment.

FIG. 1 is a conceptual diagram illustrating an example of an air-conditioning system according to a first embodiment. The air-conditioning system according to the first embodiment includes an air-conditioning operation condition generation apparatus 1, an air conditioner controller 2, multiple air conditioners 3, and multiple sensors 4. Suffix letters added to the air conditioners 3 and the sensors 4 in FIG. 1 are identifiers for distinguishing among the air conditioners 3 or the sensors 4.

The air-conditioning system of the present embodiment adjusts the state of a space which is a target of air-conditioning control by controlling the plurality of air conditioners 3. The space which is a target of air-conditioning control will be referred to as a target space. In the present description, the target space may be an entire facility such as a house or a building, or may be an area of the facility such as a room or a corridor. Moreover, the area may be a part which is actually separated, or may be a part which is virtually separated for control.

The state of a target space may refer to a temperature, humidity, airflow, air cleanliness, or the like, as long as it can be adjusted by an air conditioner 3. In the following, a description is given assuming that the air conditioner 3 is to adjust a temperature, but the state is not limited to a temperature.

For example, the air conditioners 3A and 3B illustrated in FIG. 1 are to adjust the temperature of a target space 5, surrounded by a thick frame, in a coordinated manner. In other words, at the time of adjusting the temperature of the target space 5 to a desired state, both the air conditioners 3A and 3B are operated. Though, the air conditioner 3C is to control air-conditioning of a room adjacent to the target space 5, operation of the air conditioner 3C may be controlled at the time of adjustment of the temperature of the target space 5. This is because the temperature of the target space 5 is affected also by the adjacent room. Moreover, a frame, surrounded by a dotted line, indicates an area where each air conditioner is able to control air-conditioning. In the present description, this area will be referred to as a zone. The air conditioner 3A forms a zone 31A, and the air conditioner 3B forms a zone 31B. Here, zones of the air conditioners 3 may be overlapped.

To achieve a desired state in the target space, the air-conditioning operation condition generation apparatus 1 generates operation conditions for each air conditioner 3. The operation conditions are setting values (parameters) of setting items related to operation of the air conditioner 3. A date and time of operation are also included in the operation conditions.

To achieve a desired state in the target space, the performance of each air conditioner 3, the property of the facility, and the like have to be taken into consideration. For example, in the case of cooling or heating by each air conditioner 3 to adjust the temperature of the target space, not only the outflow of heat from each air conditioner 3, but also the outflow/inflow of heat from and into zones, outside, and an adjacent room has to be considered. In FIG. 1, inflow/outflow of heat is indicated by arrows 6. If we use simulation-based method, in order to determine operation conditions to achieve a desired state, information for specifying such inflow/outflow of heat is necessary so that simulation is complicated, and the time required by the simulation is increased.

Hence, the air-conditioning operation condition generation apparatus 1 of the present embodiment generates the operation conditions on the basis of a result of a trial (test operation) performed by each air conditioner 3, without using simulation. Specifically, first, trial operation conditions are generated for multiple air conditioners 3. Then, when a trial is performed by coordination of the plurality of air conditioners on the basis of the trial operation conditions, the air-conditioning operation condition generation apparatus 1 evaluates the trial. Then, on the basis of the evaluation of the trial, the air-conditioning operation condition generation apparatus 1 generates, for the plurality of air conditioners, operation conditions to achieve the targeted state in the target space. These operation conditions indicate setting values of each air conditioner 3 for the actual operation to achieve the targeted state in the target space. These operation conditions will be referred to as optimal operation conditions (actual operation conditions). Moreover, the trial operation conditions will be referred to as trial conditions. Details of operation conditions and methods for generating the operation conditions will be described later.

The air conditioner controller 2 controls multiple air conditioners 3 in such a way as to satisfy the operation conditions generated by the air-conditioning operation condition generation apparatus 1. The method used by the air conditioner controller 2 to control the air conditioner 3 may be a well-known method without being particularly limited.

The air conditioners 3 may be installed in a facility in advance, as long as it can adjust the state of a target space by being controlled by the air conditioner controller 2. The air conditioners 3 may be well-known air conditioners.

Multiple sensors 4 are installed in the facility in advance, and are to measure the state of the target space. Here, the sensors 4 may be mounted in the air conditioners 3. Whether a desired state is achieved in the target space or not is determined on the basis of a measurement result of each sensor. For example, in the case where the desired state in the target space is 28° C., if a measurement value of the sensor 4A is 26° C., this means that there is a part of the target space where the desired state is not reached.

Data measured by the sensors 4 are used by the air-conditioning operation condition generation apparatus 1 to grasp the state of the target space. The measured data may be transmitted to the air-conditioning operation condition generation apparatus 1 directly, or may be transmitted indirectly via the air conditioner controller 2 or another collection apparatus.

Figure 2:
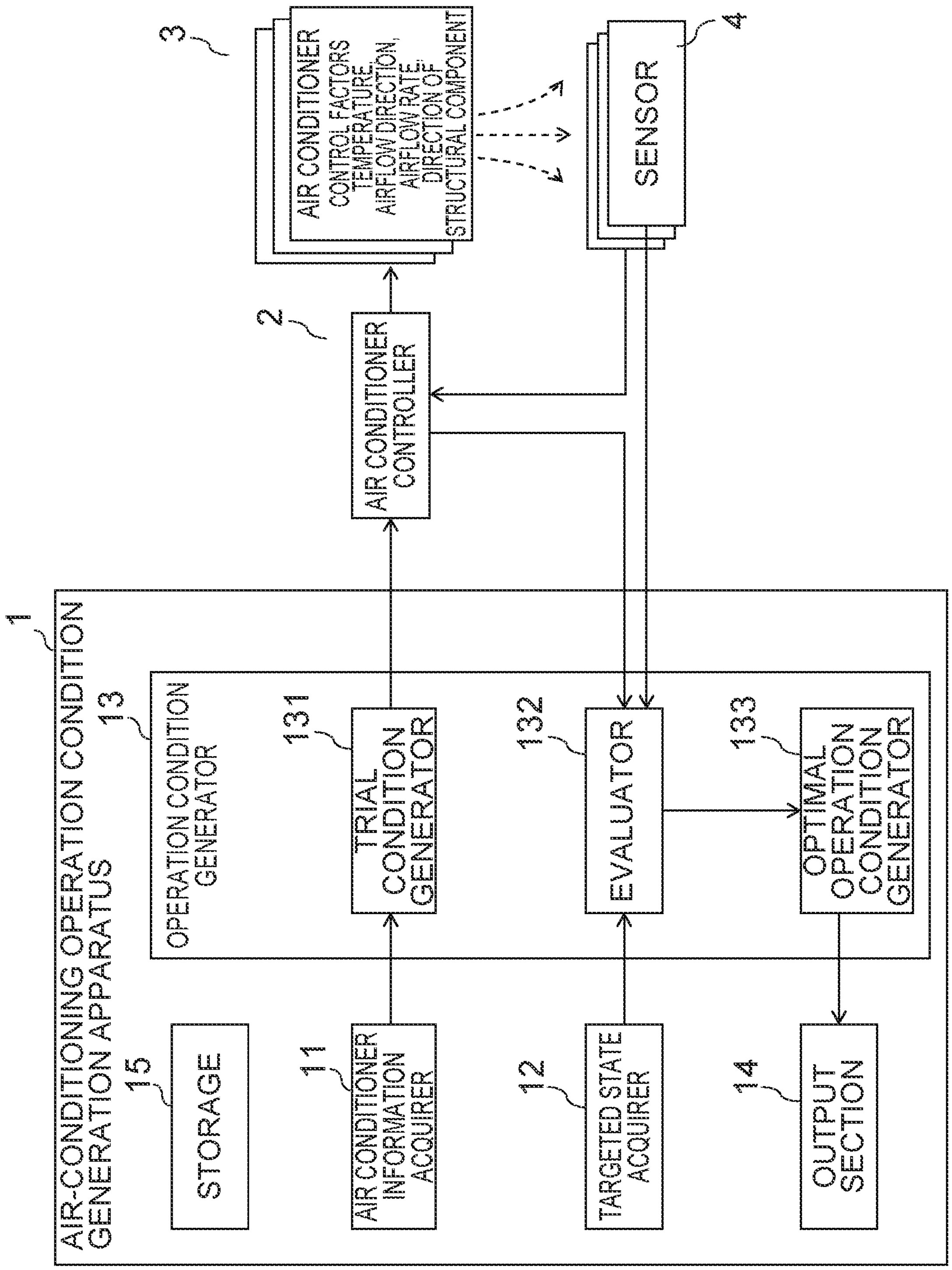
FIG. 2 is a block diagram illustrating an example of an internal configuration of an air-conditioning operation condition generation apparatus according to the first embodiment.

The detail of the air-conditioning operation condition generation apparatus 1 will be described. FIG. 2 is a block diagram illustrating an example of an internal configuration of the air-conditioning operation condition generation apparatus according to the first embodiment. The air-conditioning operation condition generation apparatus 1 includes an air conditioner information acquirer 11, a targeted state acquirer 12, an operation condition generator 13, an output device 14, and a storage 15. The operation condition generator 13 includes a trial condition generator 131, an evaluator 132, and an optimal operation condition generator (actual operation condition generator) 133.

The air conditioner information acquirer 11 acquires information about the air conditioner 3. This information will be referred to as air conditioner information. The air conditioner information is used to generate the operation conditions for each air conditioner 3. The air conditioner information may be acquired from a user or from another system. Alternatively, the information may be acquired from the air conditioner controller 2 or from each air conditioner 3.

The air conditioner information includes operation condition parameters, and a trial permitted time slot. The operation condition parameters indicate settable items and settable values for the air conditioner 3. The trial permitted time slot indicates a date and time when a trial can be performed.

FIG. 3 is a diagram illustrating examples of the operation condition parameters. In the example in FIG. 3, settable items and settable values are indicated, as operation condition parameter items, for each air conditioner which is a target of operation condition generation. Settable items other than those indicated in FIG. 3 may also be included. Furthermore, the settable items and the settable values may be different between the air conditioners 3.

The settable items are items (actuators) that can be set in a target air conditioner 3. In the example in FIG. 3, a set temperature, an airflow direction, and an airflow rate are indicated as the settable items. The settable item may be any item that can be set in the target air conditioner 3, but is not particularly limited. For example, items related to air conditioner control, such as items related to a fan, flaps, fins, louvers and the like, may be included. Moreover, in the case where multiple setting values may be set for one settable item, the one settable item may be divided into multiple independent settable items. For example, if the position of a flap can be adjusted in four directions of up, down, left and right, an independent settable item may be set for each direction. Moreover, in the case where one air conditioner includes multiple air outlets and setting can be independently performed for each air outlet, the operation condition may be generated for each air outlet.

The settable value is a value that can be set for the settable item. In the example in FIG. 3, the settable values of the set temperature are temperatures in increments of 0.5° C. from 18° C. to 29° C. The settable values of the airflow direction include two types of "down" and "horizontal" for the air conditioner 3A, and further include "swing" for the air conditioner 3B. Moreover, with respect to the settable values of the airflow rate, only "high" can be selected for the air conditioner 3A, but selection from three types of "low", "high", and "powerful" is allowed for the air conditioner 3B.

FIG. 4 is a diagram illustrating examples of the trial permitted time slots. The example in FIG. 4 illustrates trial permitted dates, and trial permitted time slots for the dates. A trial is performed at any period on a trial permitted date and time. For example, it is assumed that holidays and night times of weekdays are registered as the trial permitted date and time because no one is assumed to be in the facility in that time.

The targeted state acquirer 12 acquires information indicating the targeted state of the target space. This information may be a desired numerical value (targeted value) determined for each of the plurality of sensors 4 in the target space, or may be information indicating a deviation between the current state and the targeted state. Alternatively, it may be information indicating that the temperature is to be raised from the current state, for example.

For example, when a targeted temperature distribution in a room is generated by a person in charge of managing air-conditioning and the distribution is maintained in the room, a value which is supposed to be measured by each sensor 4 is input to the targeted state acquirer 12. Then, it is grasped that a targeted temperature value of the sensor 4A is 25.0° C., and that a targeted temperature value of the sensor 4B is 22.0° C. The targeted state is acquired in this manner.

The targeted state of each sensor 4 may be directly input, as described above. Alternatively, the targeted state of each sensor 4 may be calculated by the targeted state acquirer 12. For example, in the case where the position of each sensor 4 is grasped in advance, the targeted temperature of each sensor 4 may be calculated from the targeted temperature distribution of the target space.

With the present system, information about the position of the sensor 4 is not used at the time of determining the optimal operation. Hence, it is not necessary to acquire information about the position of the sensor 4 and to grasp the position of each sensor 4. In the case where the position of the sensor 4 is changed, a trial only has to be performed to determine the optical operation conditions after the position of the sensor 4 is changed.

The operation condition generator 13 generates the operation condition of each air conditioner 3 for realizing the targeted state. The process of the operation condition generator 13 will be described together with an internal configuration of the operation condition generator 13.

The trial condition generator 131 generates multiple sets of trial conditions on the basis of the settable items and the settable values for the air conditioners. The trial conditions include a time or a time slot when a trial is to be performed, and setting values of the settable items for each of the plurality of air conditioners 3. The time or the time slot when a trial is to be performed is determined in the trial permitted time slot. The setting value is selected from the settable values of the operation condition parameters. Trials may be performed multiple times under the same combination of setting values and the average of the trials is evaluated.

Though trials for the air conditioners 3 may be performed one by one in order, the trials are assumed to be performed simultaneously in the present embodiment.

FIG. 5 is a diagram illustrating examples of generated trial conditions. In the example in FIG. 5, a first trial is performed on August 1st, between one o'clock and two o'clock. The actual trial start time may be freely set by the air conditioner controller 2 in a designated time slot. Furthermore, as illustrated in FIG. 5, the setting values are set for each air conditioner 3. Here, FIG. 5 assumes trial conditions for deriving optimal operation conditions at the time of heating operation. Such trial conditions are sent to the air conditioner controller 2, and the air conditioner controller 2 controls each air conditioner 3 on the basis of the trial conditions for each air conditioner 3. Then, each air conditioner 3 performs a trial according to the determined setting values in a time slot determined by the trial conditions.

The evaluator 132 calculates an evaluation value of each trial, on the basis of the measurement values of the plurality of sensors 4 measured in each trial and the targeted state acquired by the targeted state acquirer 12. As described above, the plurality of sensors 4 are installed at multiple parts in the target space, and thus, the measurement values of the sensors 4 indicate the states at the respective parts in the target space. That is, the targeted states of the sensors 4 are synonymous with the targeted states at the plurality of parts where the sensors 4 are located. The evaluation value indicates how close states at the plurality of parts in the target space are to the targeted states.

FIGS. 6A and 6B are diagrams illustrating examples of measurement results and evaluation values. FIG. 6A illustrates temperatures at the end of a trial. The measurement results may include time-series measurement values during a trial, in addition to the measurement value at the end of the trial. For example, data about the change in the temperature measured every minute may be used.

FIG. 6B illustrates the evaluation value calculated for each trial. An arbitrary method may be set to calculate the evaluation value. For example, an absolute value of a difference between an actually measured temperature and a targeted temperature may be taken as the evaluation value. Alternatively, a squared error between the actually measured temperature and the targeted temperature may be taken as the evaluation value.

In this case, the state of air-conditioning in the target space is used as the targeted state, and the degree of deviation from the targeted state is calculated as the evaluation value. Alternatively, an item other than the state of air-conditioning may be used as the target of evaluation. For example, the amount of power consumed by the air conditioner 3 may be included as an item for the evaluation value. For example, the amount of power consumed by the air conditioner 3 in a trial is acquired from the air conditioner 3 or the like. Then, in the case where a lower evaluation value means better operation conditions, the evaluation value is calculated by using a calculation formula according to which a greater amount of power consumption results in a higher evaluation value. Operation conditions with an excessively great amount of power consumption may thereby be prevented from being made the optimal operation conditions, and an air-conditioning system achieving both reduction in the amount of power consumption and achievement of a targeted state may be structured.

A trial may be performed multiple times. Different results are often obtained by the same trial due to external environmental factors and the like. Hence, evaluation on the basis of results obtained by performing a trial multiple times is more reliable than evaluation on the basis of a result obtained by performing the trial once. The evaluator 132 may thus evaluate a trial on the basis of an average of multiple trial results, for example.

Here, a scheduled performance time slot for a trial included in generated trial conditions may be determined later to be a time slot not suitable for the trial. For example, in the case where weather forecast information indicating that the outside temperature will be extremely high or extremely low, or that rain is expected, or that a typhoon will be approaching in the scheduled performance time slot for a trial is acquired, it is better that the trial is cancelled or postponed.

Therefore, the trial condition generator or another component may acquire information about suitability for performing a trial in the scheduled time slot for the trial and determine whether to cancel or postpone the trial on the basis of the information. In the case where a trial is cancelled or postponed, the trial condition generator or another component issues an instruction to invalidate the generated trial conditions, or modifies or regenerates the trial conditions. The trial may thus be cancelled or postponed.

The optimal operation condition generator 133 generates optimal operation conditions from trial conditions on the basis of evaluation values of trials. For example, trial conditions which are assumed to be optimal may be selected from multiple sets of trial conditions, and be made the optimal operation conditions. In FIG. 6B described above, the evaluation value is the smallest for the twentieth trial. Because a smaller evaluation value means a smaller deviation from the targeted state, it can be seen that the conditions of the twentieth trial are the operation conditions that achieve a state closest to the targeted state. Hence, the optimal operation condition generator 133 may take the conditions of the twentieth trial as the optimal operation conditions. The setting values of the trial conditions selected from multiple sets of trial conditions may be adjusted to generate the optimal operation conditions, instead of making the selected trial conditions the optimal operation conditions as they are.

The output device 14 outputs information about processing performed by the air-conditioning operation condition generation apparatus 1. For example, the information includes the optimal operation conditions for each air conditioner 3. Moreover, the evaluation value of each trial may also be output.

Here, information to be output from the output device 14 is not particularly limited, and information acquired from the air conditioner controller 2, the air conditioner 3, and the sensor 4 may also be output.

Furthermore, the output method of the output device 14 is not particularly limited. An image or a sound may be output via a display or the like, or a processing result may be saved in an electronic file in a storage device, for example.

FIG. 7 is a diagram illustrating examples of output results. The measurement result of each sensor 4 for a trial, the state inside the target space, and air-conditioning settings, which are the optimal operation conditions, are indicated. It can be seen that the air-conditioning settings, which are the optimal operation conditions, are set for each air outlet.

The storage 15 stores input information, a processing result of each process, and the like. Information to be stored is not particularly limited. Each component of the air-conditioning operation condition generation apparatus 1 is capable of inputting or outputting information from the storage 15. Alternatively, a separate storage may be provided for each type of information to be stored.

Methods for generating operation conditions and flows of processing by the components of the air-conditioning operation condition generation apparatus 1 will be described. The flow of processing is different depending on the method for generating operation conditions, and thus, a description will be given for each method for generating operation conditions. Here the methods described below are only examples, and are not restrictive.

(First Generation Method)

Figure 8:
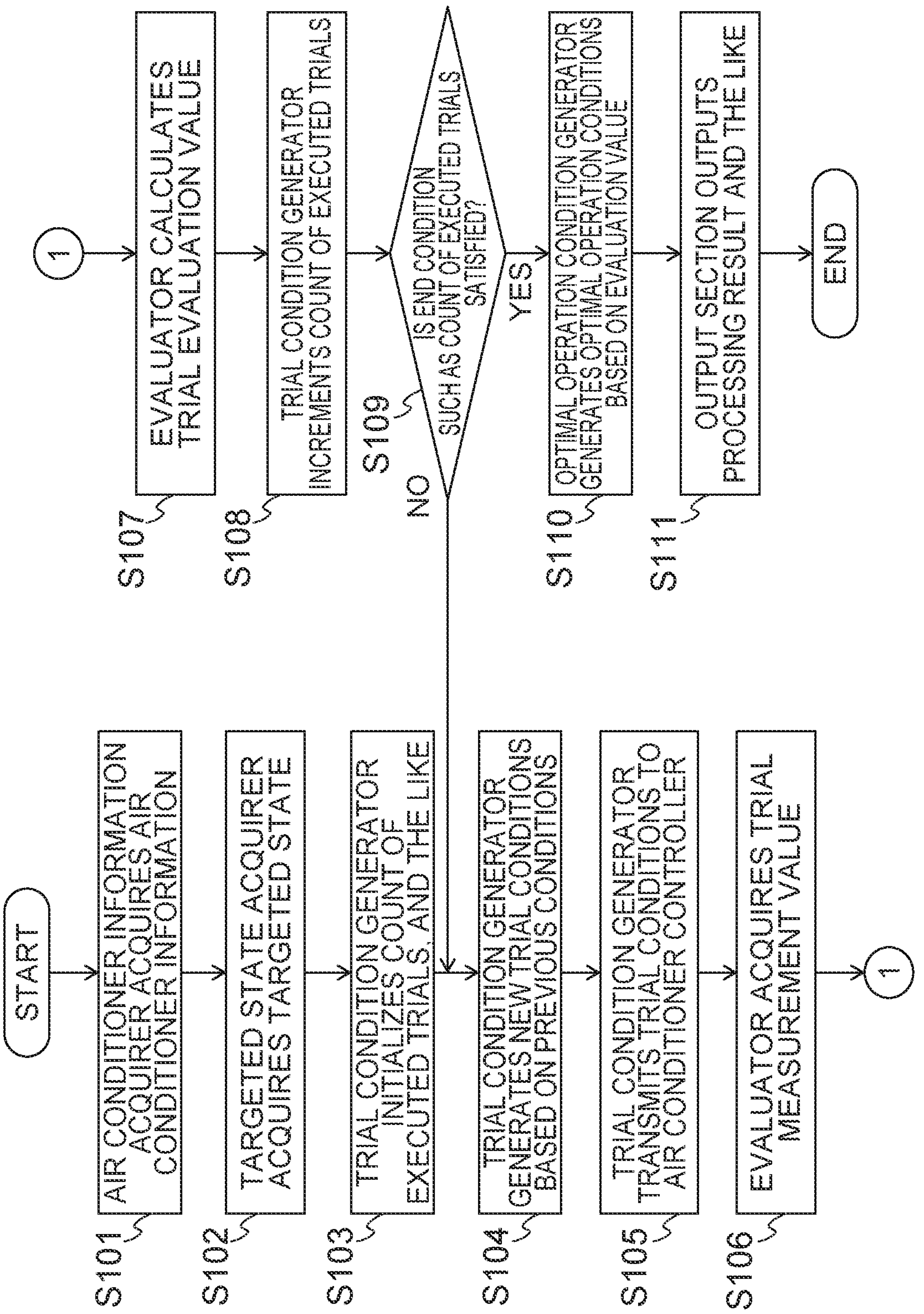
FIG. 8 is a diagram illustrating an example of a flowchart of an optimal operation condition generation process which uses a first generation method.

FIG. 8 is a diagram illustrating an example of a flowchart of an optimal operation condition generation process which uses a first generation method. First, the air conditioner information acquirer 11 acquires air conditioner information (S101). For example, the settable items of each air conditioner 3 are a set temperature, an airflow rate, and an airflow direction. Furthermore, the settable values of the set temperature are temperatures in increments of 0.5° C. from 18° C. to 29° C. Moreover, the settable values of the airflow rate are "low", "high", and "powerful". Moreover, i the settable values of the airflow direction are "down", "horizontal", and "swing".

The targeted state acquirer 12 acquires a targeted state (S102). For example, the sensor 4A and the sensor 4B are the target sensors 4 which are to achieve targeted states, and the targeted state of the sensor 4A is 25° C. and the targeted state of the sensor 4B is 22° C.

The trial condition generator 131 initializes the count of executed trials (S103), for example. Then, the trial condition generator 131 generates new trial conditions on the basis of previous trial conditions (S104). Here, previous trial conditions may include not only the immediately preceding trial conditions, but also trial conditions up to then.

Then, Generation of trial conditions according to the first generation method will be described. The first generation method is a method of generating new trial conditions from previous trial conditions by using a neighborhood search method. That is, in a state space where a settable item is taken as a variable, a neighboring point of a position in the immediately preceding trial is generated, and an optimal position is retrieved.

Figure 9:
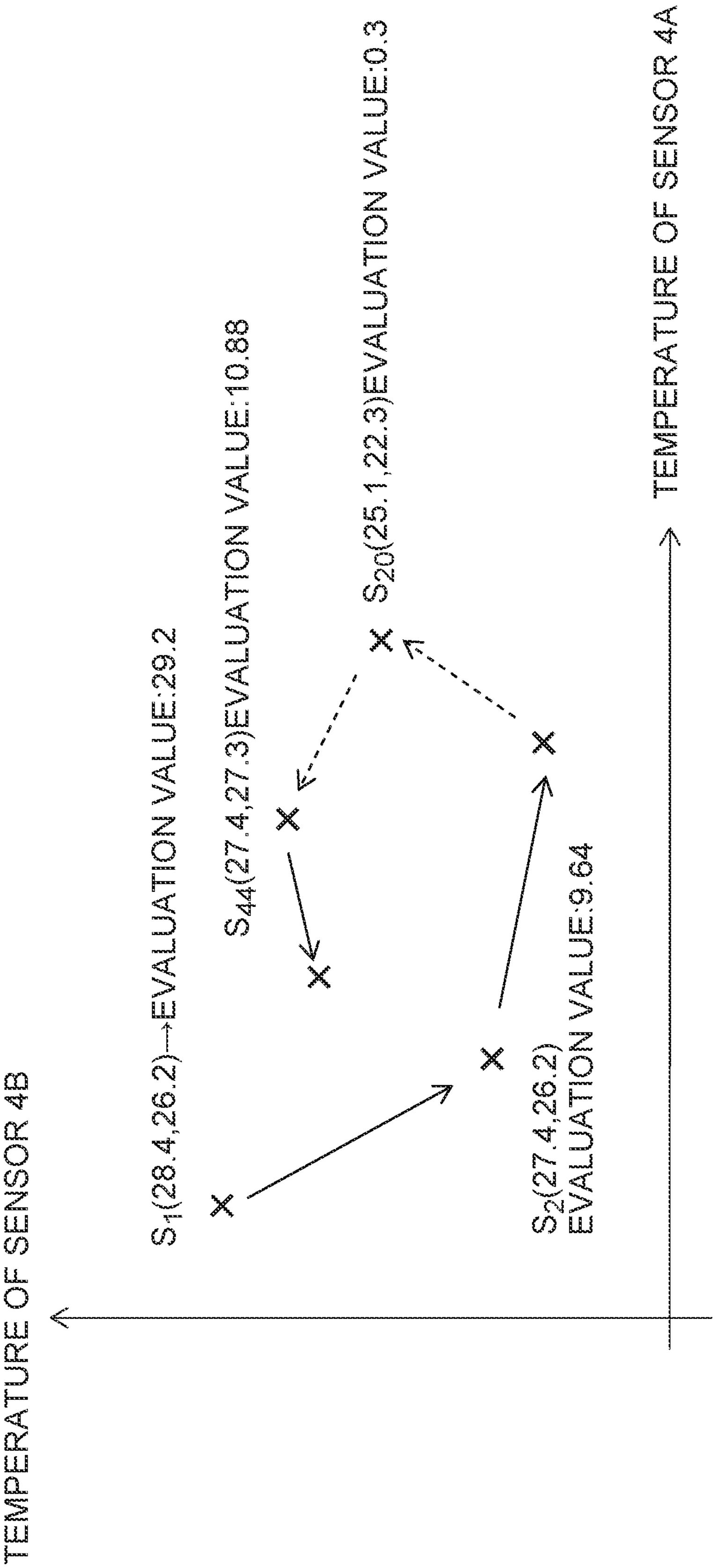
FIG. 9 is a diagram describing the first generation method.

FIG. 9 is a diagram describing the first generation method. Coordinates of temperatures of the sensors 4A and 4B in a k-th (k is an integer of one or more) trial are indicated by "$S_k$". By keep generating trial conditions at neighboring points, it is possible to generate trial conditions which are closer to the trial conditions which achieve the targeted state.

The neighboring point is generated by changing the setting value of a settable item in the preceding trial conditions. A setting value after change may be determined by using a heuristic method such as simulated annealing, a genetic algorithm, a taboo search or the like. Alternatively, the neighboring point may be acquired by changing the contents of a settable item of preceding trial conditions to predetermined contents. The predetermined contents will be referred to as a neighborhood search operation.

For example, a case is assumed where trial conditions for raising the temperature of the zone 31A are to be generated. In this case, new trial conditions may be generated by selecting one neighborhood search operation from multiple neighborhood search operations as exemplified by the following (1) to (6).

(1) Raise the set temperature of the air conditioner 3A in the zone 31A.

(2) Change the airflow rate of the air conditioner 3A in the zone 31A from "low" to "high", or from "high" to "powerful".

(3) Change the airflow direction of the air conditioner 3A in the zone 31A to downward.

(4) Raise the set temperature of the air conditioner 3B in the adjacent zone 31B of the zone 31A.

(5) Change the airflow rate of the air conditioner 3B in the adjacent zone 31B of the zone 31A from "low" to "high", or from "high" to "powerful".

(6) Change the airflow direction of the air conditioner 3B in the adjacent zone 31B of the zone 31A to downward.

Thus, the trial conditions for the air conditioner 3 for a zone which is adjacent to the intended zone may be changed, instead of those for the intended zone.

Here, the next trial conditions may be generated each time on the basis of the result of a preceding trial, or multiple sets of trial conditions may be collectively generated.

The generated trial conditions are sent to the air conditioner controller 2 (S105). Then, the trial is performed when the air conditioner controller 2 controls each air conditioner 3, and as a result, the evaluator 132 acquires measurement values of the sensors 4 for the trial (S106).

In the case of successively performing multiple trials, the state of the target space at the start of a trial is different for each trial, and comparison of results of the trials is difficult. Accordingly, an interval time may be provided between trials so as to wait for the original state to be restored. Alternatively, operation of returning the state of the target space to the original state may be performed. For example, an interval time of one hour may be provided between k-th heating operation and (k+1)th heating operation, or cooling operation may be performed in the interval time to return the target space to the original state. Trials may thus be started from approximately the same state so as to facilitate comparison of results of the trials.

On the basis of the acquired measurement values for a trial, the evaluator 132 calculates the evaluation value for the trial as illustrated in FIGS. 6A and 6B (S107). For its part, the trial condition generator 131 increments the count of executed trials (S108).

The trial condition generator 131 checks a flow end condition, and if the flow end condition is not satisfied (S109: NO), the trial condition generator 131 returns to the process of S104, and generates next trial conditions. As the flow end condition, conditions such as the count exceeding a limit number and the evaluation value falling below a threshold are conceivable.

In the case where the flow end condition is satisfied (S109: YES), the optimal operation condition generator 133 generates the optimal operation conditions on the basis of the plurality of trials (S110). In the example in FIGS. 6A and 6B, the optimal operation conditions are generated on the basis of the trial conditions, surrounded by a thick frame, with the smallest evaluation value. The optimal operation conditions may use the setting values of the trial conditions with the smallest evaluation value as they are, or may use values obtained by finely adjusting such setting values.

Lastly, the output device 14 outputs a processing result such as the optimal operation conditions (S111). The flow of the optimal operation condition generation process is thereby ended.

Here, the above flowchart is only an example, and the order of processes and the like are not limited thereto as long as a necessary processing result can be obtained. For example, the processes in S101 and S102 may be performed in parallel. The processing result of each process may be stored in the storage 15 in a sequential manner, and each component may acquire a processing result by referring to the storage 15. The same thing can be said for the flowcharts described below.

(Second Generation Method)

In a second generation method, a degree of influence of each air conditioner 3 on the measurement value of each sensor 4 is determined, and the optimal operation conditions are generated in order from the air conditioner 3 with the highest degree of influence. Furthermore, an amount of change to be added to current trial conditions is determined on the basis of the degrees of influence of the air conditioners 3. The optimal operation conditions may thereby be generated by performing a trial fewer times than in the first generation method.

Figure 10:
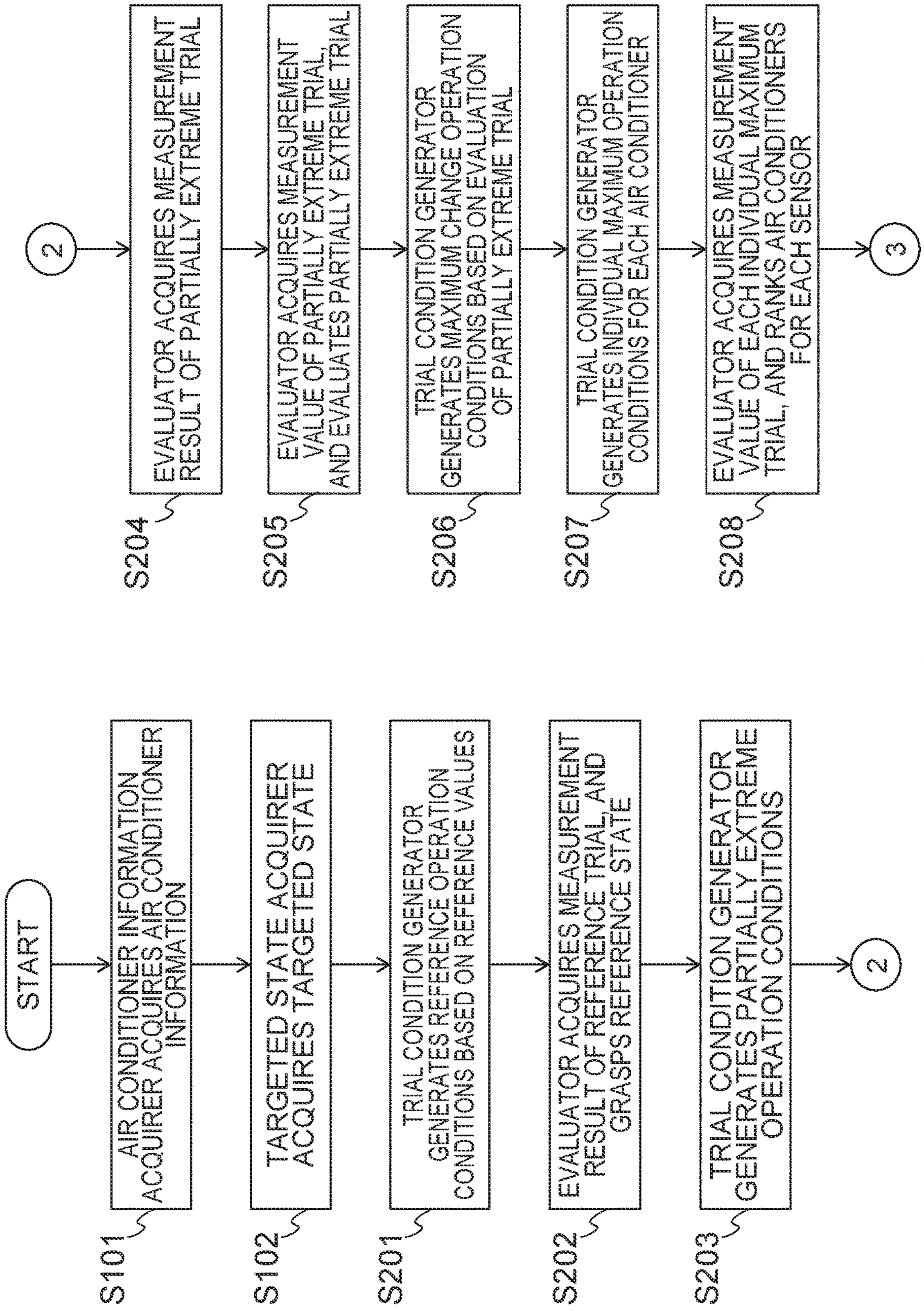
FIG. 10 is a diagram illustrating an example of a flowchart of a first half of an optimal operation condition generation process which uses a second generation method.

FIG. 10 is a diagram illustrating an example of a flowchart of a first half of an optimal operation condition generation process which uses the second generation method. FIG. 10 illustrates processing for ranking the degree of influence of each air conditioner 3 on the measurement value of each sensor 4.

The processes of S101 and S102 are the same as those of the first generation method. A process of calculating maximum change operation conditions for each air conditioner 3 is then performed. The maximum change operation conditions refer to the operation conditions which cause the state of a target space to change the most in the direction of an intended state. For example, in the case where the air conditioner 3 is to perform cooling, the maximum change operation conditions refer to the operation conditions which reduce the temperature of the target space the most, and in the case where the air conditioner 3 is to perform heating, they refer to the operation conditions which raise the temperature of the target space the most. Moreover, for example, in the case where the air conditioner 3 is to perform humidification, the maximum change operation conditions refer to the operation conditions which increase the humidity in the target space the most.

Specifically, first, the trial condition generator 131 generates trial conditions in which the settable items of all the air conditioners 3 take reference values (S201). The reference values are determined in advance. For example, 25° C., "high", and "horizontal" are determined as the reference values for the set temperature, the airflow rate, and the airflow direction, respectively. The trial conditions in which the settable items of all the air conditioners 3 take the reference values will be referred to as reference operation conditions, and a trial performed under the reference operation conditions will be referred to as a reference trial.

The reference trial is performed via the air conditioner controller 2, and the evaluator 132 acquires measurement results of the sensors 4 for the reference trial (S202). The measurement results for the reference trial are used as a reference state of the target space.

In the case where the reference state of the target space is to be acquired from a person in charge of managing air-conditioning or the like, processes in S201 and S202 may be skipped.

Next, the trial condition generator 131 generates multiple sets of partially extreme operation conditions (S203). The partially extreme operation conditions are trial conditions in which the value of one settable item takes an extreme value, and the values of the rest of the settable items take the reference values. The extreme value is determined in advance. Moreover, a trial performed under the partially extreme operation conditions will be referred to as a partially extreme trial.

FIG. 11 is a diagram illustrating examples of partially extreme operation conditions. For example, in the case where a settable range of the set temperature is from 18° C. to 29° C., 18° C. and 29° C., which are limit values, are taken as extreme values. Furthermore, in the case where which settable value is the extreme value is not known, as in the case of the airflow rate and the airflow direction, all the settable values may be treated as the extreme values. When two types of 18° C. and 29° C. are taken as the extreme values for the set temperature, two types of "low" and "powerful" as the extreme values for the airflow rate, and three types of "horizontal", "swing", and "down" as the extreme values for the airflow direction, a total six types of partially extreme operation conditions as illustrated in the drawing are generated. In this case, "high" of the airflow rate is excluded from extreme value candidates, assuming that "high" is between "low" and "powerful" and is not extreme operation. It is also possible to include "high" as a candidate for extreme operation. Alternatively, trials may be performed repeatedly under the same settable values and the average of the results of the trials is evaluated. It is also possible to take only a lower temperature limit value (18° C.) as the extreme value in the case of cooling, and to take only a higher temperature limit value (29° C.) as the extreme value in the case of heating.

The partially extreme trials are performed via the air conditioner controller 2 and are measured by the sensors 4, and then the measurement results are acquired by the evaluator 132 (S204). Then, the evaluator 132 evaluates each of the partially extreme trial on the basis of the amount of change in the state of the target space calculated from the measurement results (S205). With respect to evaluation of the partially extreme trials, for example, in the case where the temperature of the target space is desired to be reduced, the evaluation is higher as a greater amount of reduction is achieved in the average value of measured temperatures of the sensors 4.

Then, on the basis of the evaluations of the partially extreme trials, the trial condition generator 131 determines which extreme value should be selected for each settable item, and then generates maximum change operation conditions by combining the selected extreme values (S206). In an example of FIG. 11, the third and the fourth partially extreme trial have different extreme values for the airflow rate. If the fourth partially extreme trial has the highest evaluation, "powerful" is determined as the extreme value for the airflow rate. Also, the fifth and the sixth partially extreme trial have different extreme values for airflow direction, and the reference trial has another extreme value for airflow direction ("horizontal"). If the sixth partially extreme trial has the highest evaluation among three patterns: the fifth and the sixth partially extreme trial and the reference trial, "down" is determined as the extreme value for the airflow direction. Also, if cooling is to be performed, 18° C. is the extreme value for the set temperature. Thereby, the extreme values for all the settable items are selected, and maximum change operation conditions in which the set temperature is 18° C., the airflow rate is "powerful", and the airflow direction is "down" are generated. The maximum change operation conditions are generated in this manner.

When the maximum change operation conditions are specified by a user, processes from S203 to S206 can be skipped.

Next, a process of calculating the influence of each air conditioner 3 on each sensor 4 is performed. Specifically, first, the trial condition generator 131 generates operation conditions which cause one air conditioner 3 to perform a maximum change trial, and the rest of the air conditioners 3 to perform a reference trial (S207). These operation conditions will be referred to as individual maximum operation conditions, and a trial performed under the individual maximum operation conditions will be referred to as an individual maximum trial.

The individual maximum trial is performed several times such that all the air conditioners 3 sequentially perform the maximum change trial. In the case where there are the air conditioners 3A, 3B, and 3C, an individual maximum trial when only the air conditioner 3A performs the maximum change trial, an individual maximum trial when only the air conditioner 3B performs the maximum change trial, and an individual maximum trial when only the air conditioner 3C performs the maximum change trial are performed.

The evaluator 132 acquires the result of each individual maximum trial, and grasps the influence of each air conditioner 3 on each sensor 4 (S208). The air conditioners 3 are thereby ranked, for each sensor 4, in the descending order of influence.

The evaluator 132 also perceives existence of a sensor 4 which is hardly affected by any of the air conditioners 3 in the target space. That is, an unvarying state part where hardly any change in the state is caused even when a trial is performed is sometimes present. In the case where such an unvarying state part is perceived, the evaluator 132 may output information about the unvarying state part via the output device 14. For example, the position of the unvarying state part, the identifier of the sensor 4 which has measured the unvarying state part, and the like are output. A person in charge of managing air-conditioning or the like is thereby allowed to grasp that there is a part of the target space where control of air-conditioning is not performed, and may change the layout of equipment or the like in the target space. In this case, the evaluator 132 recognizes a part where a change in the state caused by a trial is within a predetermined range as the unvarying state part.

Figure 12:
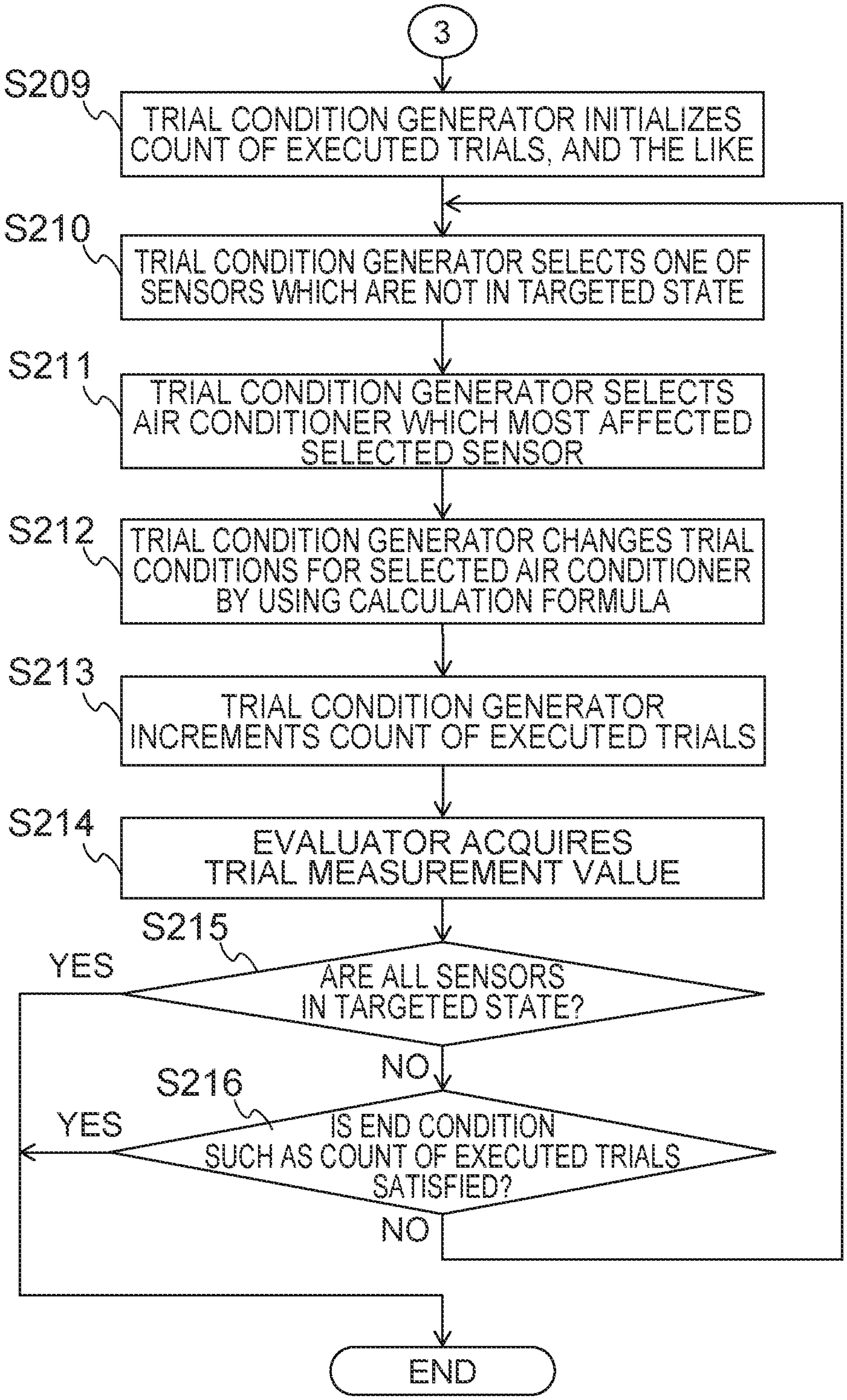
FIG. 12 is a diagram illustrating an example of a flowchart of a second half of the optimal operation condition generation process which uses the second generation method.

Then, a process of calculating the optimal operation conditions for each air conditioner 3 is performed. FIG. 12 is a diagram illustrating an example of a flowchart of a second half of the optimal operation condition generation process which uses the second generation method. FIG. 12 illustrates processing regarding a trial for determining the optimal operation conditions for each air conditioner 3.

First, the trial condition generator 131 initializes the count of executed trials or the like (S209). Next, the trial condition generator 131 selects one of sensors 4 which are not in the targeted state (S210). A sensor 4 whose current measurement value is the furthest from the reference value is desirably selected. This is because the reference value is expected to be approached fastest by performing adjustment in order from the sensor with the furthest value.

Next, on the basis of the results of the individual maximum trial, the trial condition generator 131 selects the air conditioner 3 which has most affected the selected sensor 4 (S211). When the same air conditioner 3 was selected in the immediately preceding trial (for example, the air conditioner 3A), the second influential air conditioner 3 (for example, the air conditioner 3B) may be selected from the air conditioners 3 excluding the air conditioner 3A.

Then, the trial conditions for the selected air conditioner 3 are changed (S212). The new trial conditions after the change are calculated by a calculation formula for the amount of change in the operation conditions. Here, the initial values of the operation conditions are assumed to be the reference operation conditions. The calculation formula for the amount of change in the operation conditions will be described later. The trial condition generator increments the count of executed trials (S213).

Then, trial of the selected air conditioner 3 is performed by the air conditioner controller 2 under the new trial conditions, and then the trial result is acquired by the evaluator (S214). If the trial result shows that not all the sensors 4 satisfy the targeted state (S215: NO), an end condition, such as the count of executed trials, is checked. In the case where the end condition is not satisfied (S216: NO), the process of S210 is performed again, and a sensor and an air conditioner are selected again, and then the trial conditions are generated for the air conditioner, and then a trial is performed. When, due to the processing described above, all the sensors have reached the targeted state (S215: YES) or the end condition, such as the count of executed trials, is satisfied (S216: YES), the flow is ended. The optimal operation conditions for the air conditioners are determined.

The calculation formula for the amount of change in the operation conditions will be described. When the current operation conditions are given as "s", the next operation conditions as "$s_{next}$", and the amount of change related to update of the operation conditions as "Δs", the next operation conditions "$s_{next}$" are calculated by the following equation.

[Expression 1]

$$s_{next}=s+\Delta s\cdot\{s_{strong\_each}(a)-s\} \tag{1}$$

The amount of change Δs may be determined by the following equation.

[Expression 2]

$$\Delta s=\frac{d_{target}(m)-d(s,m)}{d(S_{strong\_each}(a),m)-d(s,m)} \tag{2}$$

In the equation, the variable "m" indicates the selected sensor 4, and the variable "a" indicates the selected air conditioner 3. The measurement value of the sensor "m" in the targeted state is indicated by "$d_{target}$(m)". The measurement value of the sensor "m" under the current operation conditions "s" is indicated by "d(s,m)". The individual maximum trial when the air conditioner "a" performs the maximum change trial is indicated by "$s_{strong\_each}$(a)". The measurement value of the sensor "m" at the time of the individual maximum trial when the air conditioner "a" performs the maximum change trial is indicated by "d($S_{strong\_each}$(a),m)".

For example, it is assumed that the targeted temperature of the sensor "m" is 24.0° C., and that the temperature of the sensor "m" in a trial under the current operation conditions "s" is 26.0° C. Furthermore, the temperature of the sensor "m" in the individual maximum trial when the air conditioner "a" performs the maximum change trial is assumed to be 29.0° C. In the case of such an assumption, the amount of change "Δs" is calculated by (26.0−24.0)/(29.0−24.0)=0.4.

The operation conditions "s" are expressed as a vector whose dimension is the number of settable items. The numerical values are uses as they are with respect to the temperatures and the like, and numbers are assigned to categories such as "high" and "down". For example, "0", "1", and "2" are assigned to "high", "low", and "powerful" of the airflow rate, respectively. Moreover, "0", "1", and "2" are assigned to "horizontal", "down", and "swing" of the airflow direction, respectively. In the case where the individual maximum trial "$S_{strong\_each}$(a)" of the air conditioner "a" is expressed by (29.0, 2, 0) and the operation conditions "s" by (25.0, 1, 1), the "$s_{next}$" will be as follows.

[Expression 3]

$$\begin{aligned}s_{next}&=(25.0,1,1)+0.4\cdot\{(29.0,2,0)-(25.0,1,1)\}\\&=(25.0,1,1)+0.4\cdot(4.0,1,-1)\\&=(26.6,1.4,0.6)\end{aligned} \tag{3}$$

Numbers with decimal points, such as 1.4, are turned into integers by any appropriate methods such as rounding down, rounding up, or rounding to the nearest tenth. Furthermore, numerical values such as the set temperatures are adjusted into settable values. For example, in the case where the set temperature of the air conditioner 3 can be set in units of 0.5° C., 26.6° C. cannot be set and is thus changed into a closest settable value.

In the present case, each settable item is expressed by a method of expressing by one value, but one-hot representation which assigns "0" in a case of performing setting and "1" in a case of not performing setting may alternatively be used. For example, in the case of using the one-hot representation with respect to the airflow direction, the operation conditions "s" may be expressed by a five-dimensional vector including the set temperature, the airflow rate, whether the airflow direction is "horizontal" or not, whether the airflow direction is "down" or not, and whether the airflow direction is "swing" or not.

When (26.6, 1, 1) is calculated for the next operation conditions "$s_{next}$" in the above manner, the set temperature, the airflow rate, and the airflow direction in the next operation conditions are determined to be 26.5° C., "low", and "down", respectively.

In the case where "Δs" is 0 or less, the air conditioner 3 for which the operation conditions are to be changed may be changed to another air conditioner 3.

Calculated operation conditions may sometimes be the same as previous operation conditions. For that reason, a record of generated operation conditions may be stored in the storage 15 or the like, and when operation conditions included in the record are generated, one or some of the setting values of the generated operation conditions may be changed by generating a second closest settable value instead of the closest settable value, for example.

The calculation formula described above is only an example, and multiple calculation formulae may be used without being limited to the one described above. For example, in the case where the temperature of the sensor 4 becomes too low due to a trial when operation conditions for reducing the temperature are being searched for, the operation conditions may be returned to the previous operation conditions, and operation conditions may be generated again by a different calculation formula. Moreover, if the measurement value of a sensor 4 is hardly changed by a trial performed using a certain calculation formula, the calculation formula may be prevented from being used again.

In the case where the time of measurement of each sensor 4 is included in the measurement result, the evaluator 132 may grasp, in each trial, the time taken from the trial start time to convergence of the state of the target space. This time will be referred to as a trial convergence time. When the trial convergence time is grasped, the time when the next trial is enabled may be grasped, and as a result, the time required for performing all the trials may be reduced.

The criterion for determining convergence may be freely set as appropriate. For example, a determination criterion for determining that a state has converged, when a temperature variation within a predetermined time of 5 minutes is 0.5° C. or lower, may be provided. Alternatively, a convergence value may be predicted in advance, and convergence may be determined when the measurement value has reached the convergence value. Prediction of a convergence value may be performed by a well-known method of performing prediction on the basis of the state of variation in the measurement value, or by machine learning, regression analysis or the like.

As described above, according to the present embodiment, in the case of coordinated control of multiple air conditioners 3, operation conditions are generated for each air conditioner 3, and the measurement value of each sensor in the target space is made to come close to a targeted state. It is therefore possible to realize a desired state not only in the entire target space which is subjected to air-conditioning control, but also at a specific part of the target space.

Furthermore, a desired state may be realized also in a target space which shows non-linear complex thermal diffusivity behavior, by generating operation conditions combining multiple parameters. For example, operation conditions including setting values related to wind generated by an air conditioner, such as the airflow direction, the airflow speed, and the airflow rate, may be generated. This allows a part which is not sufficiently adjusted simply by adjusting the set temperature to be placed in a desired state, and dissatisfaction of the user can be alleviated.

Note that the optimal operation conditions can be frequently updated even if they have been determined once. For example, the best operation conditions change when the seasons change. Accordingly, if generating the optimal operation conditions is difficult, the burden on the managing person is increased. However, if the air-conditioning operation condition generation apparatus 1 of the present embodiment automatically generates the optimal operation conditions on a regular basis, such as each month, the optimal operation conditions may be updated without increasing the burden on the managing person.

Furthermore, the optimal operation conditions have to be updated also when a premise for generating the operation conditions is changed, such as when a desired state is changed due to a structural change inside a facility or a change in the distribution of personnel. Hence, when the targeted state acquirer 12 acquires information about a change in the targeted state in response to a change in the premise, the trial condition generator 131 may regenerate the trial conditions. Then, a trial may be performed in the nearest trial permitted time slot, and the optimal operation conditions may be automatically regenerated. Information about a change in the targeted state includes a change in the targeted value assigned to the sensor 4, generation of a new targeted state due to addition of a sensor 4, and elimination of a targeted state due to removal of a sensor 4.

Alternatively, the trial condition generator 131 may regenerate trial conditions, when the evaluator 132 acquires information about a change in the position of a sensor 4 in a state where information about the position of the sensor 4 is already acquired from the sensor 4 by the evaluator 132. Then, a trial may be performed in the nearest trial permitted time slot, and the optimal operation conditions may be automatically regenerated. Information about a change in the position of a sensor 4 includes a change in the position coordinates of a sensor 4, addition of a sensor 4, and removal of a sensor 4. As described above, by detecting a change in the premise and immediately regenerating the optimal operation conditions, a void in management may be prevented.

Unlike in the case of simulation and the like, information about a change in the layout of equipment or the like is not necessary to generate the optimal operation conditions. For that reason, no preliminary task is necessary to generate the optimal operation conditions even when the layout of equipment or the like is changed.

In the present embodiment, simulation is not necessary to generate the optimal operation conditions, and the cost of simulation may be avoided. Since the position of a sensor 4 does not have to be fixed, the position of a sensor 4 may be freely changed. For example, in the case where there is a request for improvement in the air-conditioning, the optimal operation conditions may be generated after moving a sensor 4 to near the user who has made the request. The possibility that an air-conditioning state desired by the user is realized may thus be increased.

Here, the air-conditioning operation condition generation apparatus 1 may be configured from multiple apparatuses which are capable of data transfer by means of communication or electrical signals. For example, the air-conditioning operation condition generation apparatus 1 can be separated into a first apparatus including the trial condition generator 131, and a second apparatus including the evaluator 132 and the optimal operation condition generator 133.

Second Embodiment

In the first embodiment, it is assumed that the targeted state of each sensor 4 is generated in advance by a person in charge of managing air-conditioning, and that the air-conditioning operation condition generation apparatus 1 acquires the generated targeted state. However, in such a case, the burden on the person in charge of managing air-conditioning is great. Accordingly, in a second embodiment, the targeted state is estimated by the air-conditioning operation condition generation apparatus 1. The burden of calculation of the targeted state may thereby be reduced.

Figure 13:
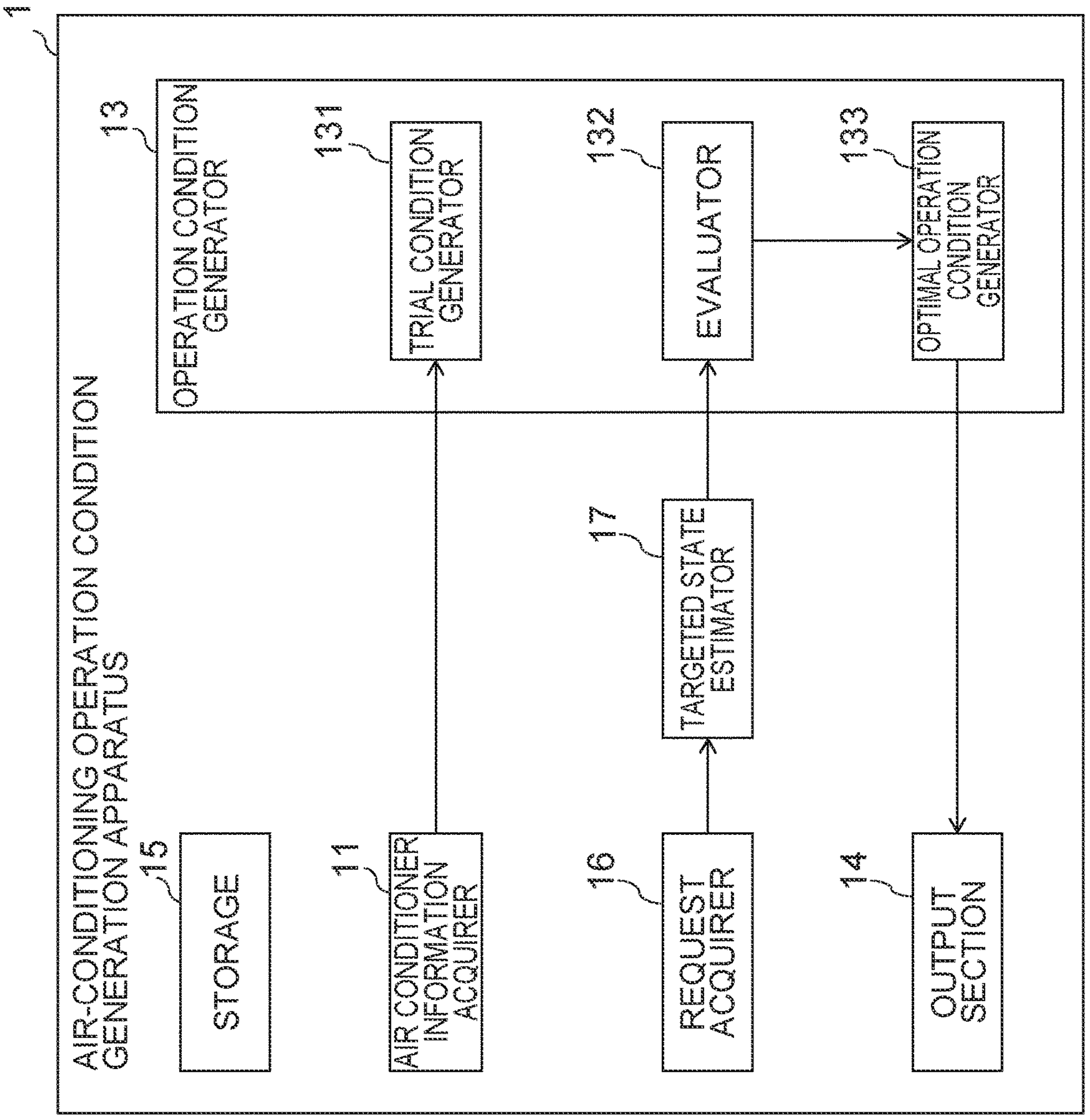
FIG. 13 is a block diagram illustrating an example of a schematic configuration of an air-conditioning operation condition generation apparatus according to a second embodiment.

FIG. 13 is a block diagram illustrating an example of a schematic configuration of an air-conditioning operation condition generation apparatus according to the second embodiment. The second embodiment is different from the first embodiment in that a request acquirer 16 and a targeted state estimator 17 are included. Here, the targeted state acquirer 12 is not illustrated in FIG. 13, but the targeted state acquirer 12 may be included or not included. A description of aspects the same as those in the first embodiment is omitted.

The request acquirer 16 acquires a request regarding the current air-conditioning control. A request includes information which allows grasping of the direction of deviation (hot, cold, etc.) from the current state. Information indicating the part associated with the request for improvement is also included.

The information indicating the part associated with the request for improvement may be any information which may link the part associated with the request for improvement and a nearby sensor. The information indicating the part associated with the request for improvement may indicate a position inside the target space, for example. The position may be relative coordinates or absolute coordinates. Alternatively, the information may indicate an object existing in the target space. An object may be equipment or a structural object existing in the target space, or a living body such as a human or other creatures in the target space, for example.

On the basis of the information indicating the part associated with the request for improvement, the targeted state estimator selects a sensor 4 to be linked to the part associated with the request from multiple sensors 4 in the target space. Then, the targeted state of the selected sensor 4 is estimated on the basis of the contents of the request.

FIG. 14 is a diagram illustrating examples of targeted states estimated on the basis of a request. An immediate measurement value and an estimated targeted state are indicated for each sensor 4. An estimated targeted state does not have to take an actual value, and it may be any information which allows the direction of improvement to be grasped on the basis of comparison with a reference measurement value or the like. In the example in FIG. 14, an up arrow indicates that a warmer temperature than the measurement value is desired for the sensor 4A. Furthermore, a down arrow indicates that a cooler temperature than the measurement value is desired for the sensor 4B.

Here, the current measurement value may be adopted for the estimated targeted state of a sensor 4 which is not selected, that is, a sensor 4 for which no request is made. Alternatively, in the case where the targeted state acquirer 12 is included, the request acquirer 16 may update only the targeted state of the sensor 4 associated with a request, among pieces of data of targeted state acquired by the targeted state acquirer 12.

With respect to linking between a sensor 4 and a part associated with a request, positions of the sensors 4 may be stored in advance, and a sensor 4 close to a part associated with a request may be extracted. Furthermore, a person in the facility and a sensor 4 may be linked in advance on the basis of positions of seats or the like, and a sensor 4 may be extracted on the basis of the person who has made a request.

The generation method for the optimal operation conditions is the same as that in the first embodiment. In the case where the targeted state is in the direction of improvement, if the direction of a change in the measurement value of the sensor 4 is different from the direction of improvement, selection as the optimal operation conditions is not performed by the evaluator 132. For example, an evaluation value is not calculated assuming that evaluation is not necessary. Alternatively, an evaluation value may be calculated which prevents selection as the optimal operation conditions. For example, in the case where a smaller evaluation value is assumed to be better, an evaluation value may be made large so as to prevent selection. Appropriate operation conditions may thus be generated while satisfying the direction of improvement.

As described above, according to the present embodiment, the burden of calculation of a targeted state may be reduced by the air-conditioning operation condition generation apparatus 1 estimating the targeted state.

Each process in the embodiments described above can be implemented by software (program). Thus, the embodiments described above can be implemented using, for example, a general-purpose computer apparatus as basic hardware and causing a processor mounted in the computer apparatus to execute the program.

Figure 15:
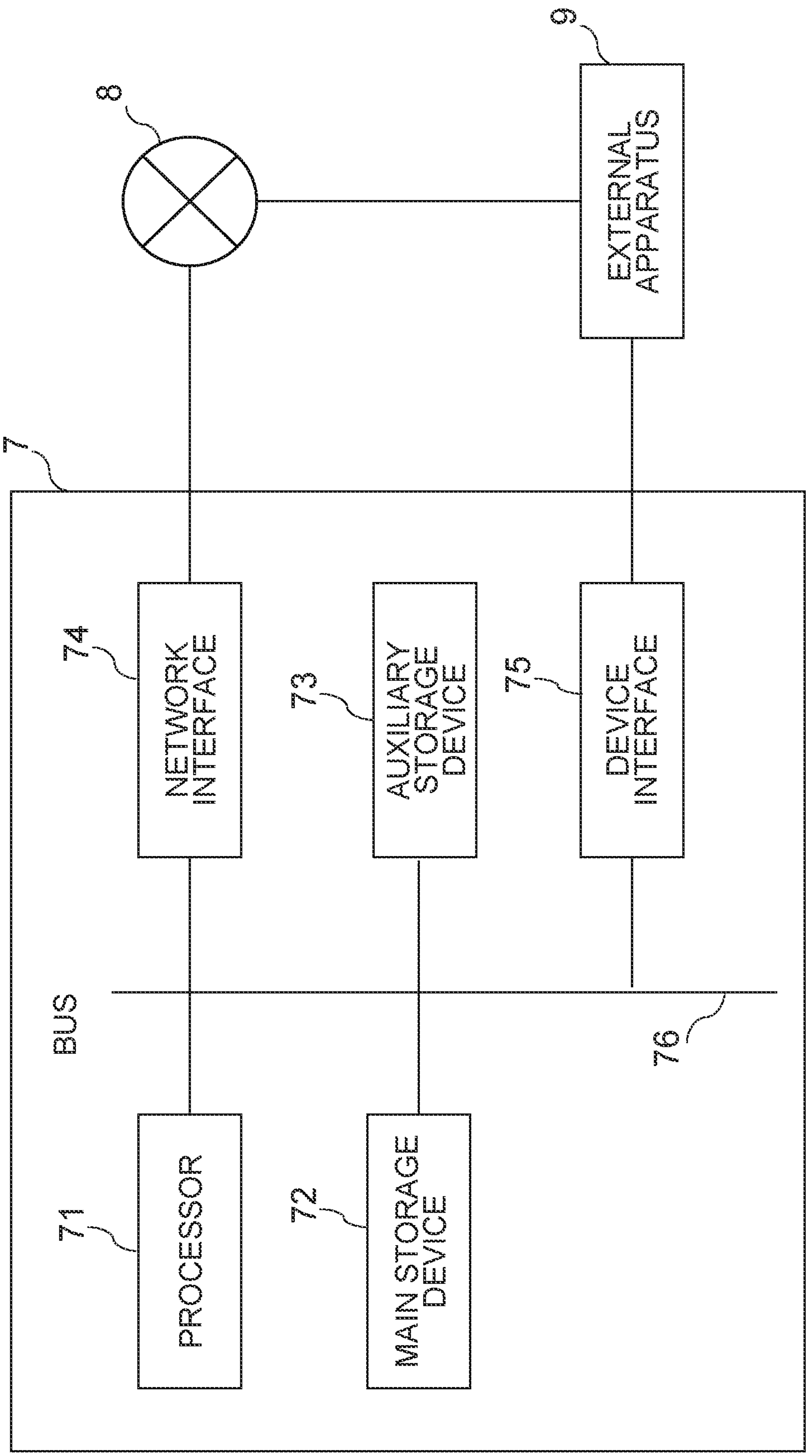
FIG. 15 is a block diagram illustrating an example of a hardware configuration according to an embodiment of the present invention.

FIG. 15 is a block diagram illustrating an example of a hardware configuration according to an embodiment of the present invention. The air-conditioning operation condition generation apparatus 1 may be realized as a computer apparatus 7 including a processor 71, a main storage device 72, an auxiliary storage device 73, a network interface 74, and a device interface 75, where these elements are interconnected by a bus 76.

The air-conditioning operation condition generation apparatus 1 according to the present embodiment may be realized by installing a program to be executed by each device in the computer apparatus 7 in advance, or may be realized by installing programs in the computer apparatus 7 at a proper timing, the programs being stored in a storage medium such as a CD-ROM, or being distributed over a communication network 8.

Though in FIG. 15, the computer apparatus includes one each of the components, multiple components may alternatively be included. Moreover, FIG. 15 illustrates one computer apparatus, but software may be installed in multiple computer apparatuses. The multiple computer apparatuses may perform different partial processes of the software to generate a processing result. That is, the air-conditioning operation condition generation apparatus 1 may be configured as a system.

The processor 71 is an electronic circuit including a control device and an arithmetic device of the computer. The processor 71 performs arithmetic processing on the basis of data input from each device or the like in the computer apparatus 7 or on the basis of a program, and outputs an arithmetic result or a control signal to each device or the like. Specifically, the processor 71 executes the operating system (OS) of the computer apparatus 7, an application or the like, and controls each device constituting the computer apparatus 7.

The processor 71 is not particularly limited as long as the processing described above can be performed. For example, the processor 71 may be a general purpose processor, a central processing unit (CPU), a microprocessor, a digital signal processor (DSP), a controller, a microcontroller, or a state machine. Furthermore, the processor 71 may be embedded in an application specific integrated circuit, a field-programmable gate array (FPGA), or a programmable logic device (PLD). Furthermore, the processor 71 may be configured from multiple processing devices. For example, a combination of a DSP and a microprocessor may be used, or one or more microprocessors that cooperate with a DSP core may be used.

The main storage device 72 is a storage device for storing commands to be executed by the processor 71, various pieces of data, and the like, and information stored in the main storage device 72 is directly read out by the processor 71. The auxiliary storage device 73 is a storage device different from the main storage device 72. Here, a storage device is any electronic component which is capable of storing electronic information. As the main storage device 72, a volatile memory, such as a RAM, a DRAM or an SRAM, which is used to save temporary information is mainly used, but the main storage device 72 according to the embodiment of the present invention is not limited to these volatile memories. Storage devices used as the main storage device 72 and the auxiliary storage device 73 may be volatile memories or non-volatile memories. A non-volatile memory may be a programmable read-only memory (PROM), an erasable programmable read-only memory (EPROM), an electrically erasable PROM (EEPROM), a non-volatile random access memory (NVRAM), a flash memory, an MRAM, or the like. Furthermore, as the auxiliary storage device 73, a magnetic or optical data storage may be used. As the data storage, a magnetic disk such as a hard disk, an optical disk such as a DVD, a flash memory such as an USB, a magnetic tape, or the like may be used.

If the processor 71 directly or indirectly reads and/or writes information from the main storage device 72 or the auxiliary storage device 73, the storage device can be said to electrically communicate with the processor. The main storage device 72 may be integrated in the processor. Also in this case, the main storage device 72 can be said to electrically communicate with the processor.

The network interface 74 is an interface to be connected to the communication network 8 in a wireless or wired manner. As the network interface 74, an interface conforming to existing communication standards may be used. An output result and the like may be transmitted from the network interface 74 to an external apparatus 9 which is communicably connected via the communication network 8.

The device interface 75 is an interface, such as an USB, to be connected to the external apparatus 9 which records output results and the like. The external apparatus 9 may be an external storage medium, or a storage such as a database. An external storage medium may be any recording medium such as an HDD, a CD-R, a CD-RW, a DVD-RAM, a DVD-R, or a storage area network (SAN). Alternatively, the external apparatus 9 may be an output device. For example, a display apparatus for displaying an image, or an apparatus for outputting audio or the like may be used. For example, a liquid crystal display (LCD), a cathode ray tube (CR), a plasma display panel (PDP), or a speaker may be used, but these are not restrictive.

Furthermore, a part or all of the computer apparatus 7, that is, a part or all of the air-conditioning operation condition generation apparatus 1, may be configured by a dedicated electronic circuit (i.e., hardware), such as a semiconductor integrated circuit, on which the processor 71 and the like are mounted. Dedicated hardware may be combined with a storage device such as a RAM or a ROM.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. An air-conditioning operation condition generation apparatus configured to:

generate trial conditions for a plurality of air conditioners associated with a target space of air-conditioning control;

perform a trial by coordination of the plurality of air conditioners under the trial conditions;

evaluate the trial; and generate optimal operation conditions for the plurality of air conditioners to achieve a targeted state in the target space on the basis of the evaluation of the trial.

2. The air-conditioning operation condition generation apparatus according to claim 1, comprising:

a trial condition generator configured to generate the trial conditions on the basis of a settable item and a settable value of the air conditioners;

an evaluator configured to evaluate the trial on the basis of measurement values at multiple parts in the target space and targeted states at the plurality of parts; and an optimal operation condition generator configured to generate optimal operation conditions for the air conditioners from trial conditions selected, based on evaluation of the trials, from multiple sets of the trial conditions.

3. The air-conditioning operation condition generation apparatus according to claim 2, wherein at least a setting value related to wind to be generated by the air conditioner is included in the trial conditions and the optimal operation conditions.

4. The air-conditioning operation condition generation apparatus according to claim 2, wherein the evaluator evaluates the trial based further on an amount of power consumption of the air conditioner during the trial.

5. The air-conditioning operation condition generation apparatus according to claim 2, further comprising:

an air conditioner information acquirer configured to acquire the settable item and the settable value;

a targeted state acquirer configured to acquire information indicating the targeted state; and an output device configured to output information including the optimal operation conditions.

6. The air-conditioning operation condition generation apparatus according to claim 5, wherein the evaluator specifies an unvarying state part in the target space on the basis of a result of the trial, the unvarying state part is a part where a change in a state caused by the trial is within a predetermined range, and the output device outputs information about the unvarying state part.

7. The air-conditioning operation condition generation apparatus according to claim 5, wherein the trial condition generator regenerates the trial conditions, when information about a change in the targeted state is acquired by the targeted state acquirer or when information about a change in the plurality of parts is acquired by the evaluator.

8. The air-conditioning operation condition generation apparatus according to claim 2, further comprising:

a request acquirer configured to acquire information about a specified part of the target space and a request regarding the specified part; and a targeted state estimator configured to estimate a targeted state of the specified part on the basis of the request, wherein the evaluator evaluates the trial by using the estimated targeted state.

9. The air-conditioning operation condition generation apparatus according to claim 8, wherein the specified part is indicated by a position in the target space or an object in the target space, and the targeted state estimator selects the specified part from the plurality of parts on the basis of the position or the object in the target space.

10. The air-conditioning operation condition generation apparatus according to claim 2, wherein the trial condition generator determines a time or a time slot when the trial is to be performed.

11. An air-conditioning operation condition generation method comprising:

generating trial conditions for a plurality of air conditioners associated with a target space of air-conditioning control;

performing a trial by coordination of the plurality of air conditioners under the trial conditions;

evaluating the trial; and generating optimal operation conditions for the plurality of air conditioners to achieve a targeted state in the target space on the basis of the evaluation of the trial.

12. An air-conditioning system comprising:

a plurality of air conditioners associated with a target space of air-conditioning control;

an air conditioner controller configured to control the plurality of air conditioners; and an air-conditioning operation condition generation apparatus configured to generate trial conditions for the plurality of air conditioners, wherein the plurality of air conditioners coordinate and perform a trial under the trial conditions by being controlled by the air conditioner controller, and the air-conditioning operation condition generation apparatus:

evaluates the trial performed by coordination of the plurality of air conditioners under the trial conditions; and generates optimal operation conditions for the plurality of air conditioners to achieve a targeted state in the target space on the basis of evaluation of the trial.

* * * * *